United States Patent [19]

Tanaka et al.

[11] Patent Number: 5,548,415
[45] Date of Patent: Aug. 20, 1996

[54] IMAGE PROCESSING APPARATUS

[75] Inventors: Kunio Tanaka, Ushiku; Kouichi Hashimoto, Tokyo, both of Japan

[73] Assignee: Riso Kagaku Corporation, Tokyo, Japan

[21] Appl. No.: 459,425

[22] Filed: Jun. 2, 1995

[30] Foreign Application Priority Data

Jun. 3, 1994 [JP] Japan ................................... 6-145374

[51] Int. Cl.$^6$ ...................................................... H04N 1/40
[52] U.S. Cl. ......................... 358/462; 382/176; 382/270; 358/447; 358/448
[58] Field of Search .................................. 358/462, 447, 358/448; 382/176, 270

[56] References Cited

U.S. PATENT DOCUMENTS 5,095,328  3/1992  Mizoguchi ............................. 358/501
5,153,925  10/1992  Tanioka et al. ........................ 358/462

*Primary Examiner*—Edward L. Coles, Sr.
*Assistant Examiner*—Tia M. Harris
*Attorney, Agent, or Firm*—Oblon, Spivak, McClelland, Maier & Neustadt, P.C.

[57] ABSTRACT

In an image processing apparatus, images on an original document captured by an image capturing device are classified into a binary image and a gradation image, and the densities of the images are then converted using density conversion curves, which are provided for binary images and gradation images, to output an image signal representing converted images. The state of a certain pixel is judged and is classified as one of a plurality of states between binary images and gradation images. Based on the results of the judgment, one curve is selected from a first density conversion curve for binary images, a second density conversion curve for gradation images and at least one third density conversion curve which interpolates the first and second density conversion curves. The density of the certain pixel is converted using the selected curve. The image processing apparatus can provide a high contrast in a binary image area of an original document and maintain the gradation of an image in a gradation image area of the original document. Also, the apparatus can output an image density signal which does not cause an unnatural vision due to an abrupt change in density.

6 Claims, 11 Drawing Sheets

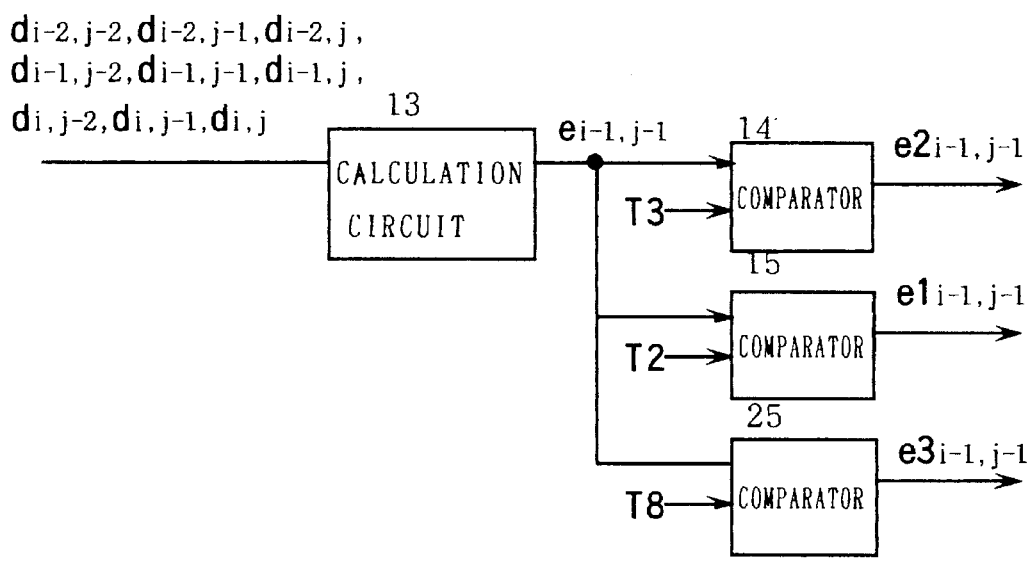

| FIRST EDGE DETECTION SIGNAL $e1_{i-1,j-5}$ | SECOND EDGE DETECTION SIGNAL $e2_{i-1,j-5}$ | THIRD EDGE DETECTION SIGNAL $e3_{i-1,j-5}$ | DENSITY CONVERSION SELECTING SIGNAL $g_{i-1,j-5}$ |
|---|---|---|---|
| ○ | — | — | 0 |
| × | ○ | — | 1 |
| × | × | ○ | 2 |
| × | × | × | 3 |

FIG. 11

| FIRST EDGE DETECTION SIGNAL $e1_{i-1,j-5}$ | DISTANCE CLASSIFYING SIGNAL $f_{i-1,j-5}$ | DENSITY CONVERSION SELECTING SIGNAL $g_{i-1,j-5}$ |
|---|---|---|
| ○ | — | 0 |
| × | 0 | 0 |
| × | 1 | 1 |
| × | 2 | 2 |
| × | 3 | 3 |

F I G. 1 3
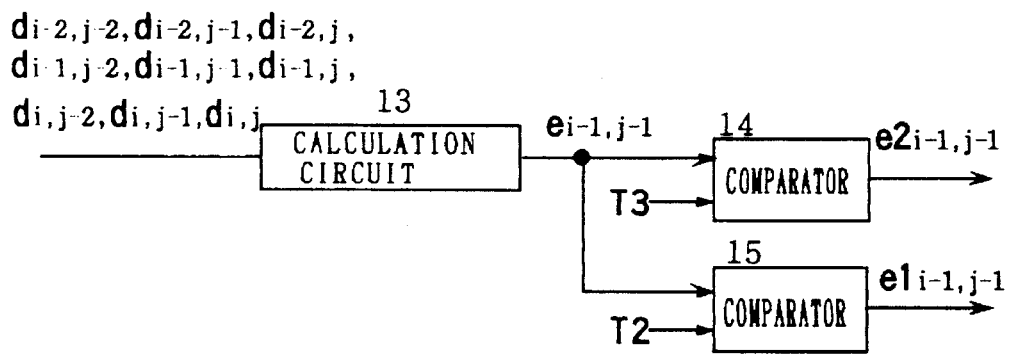
F I G. 1 4
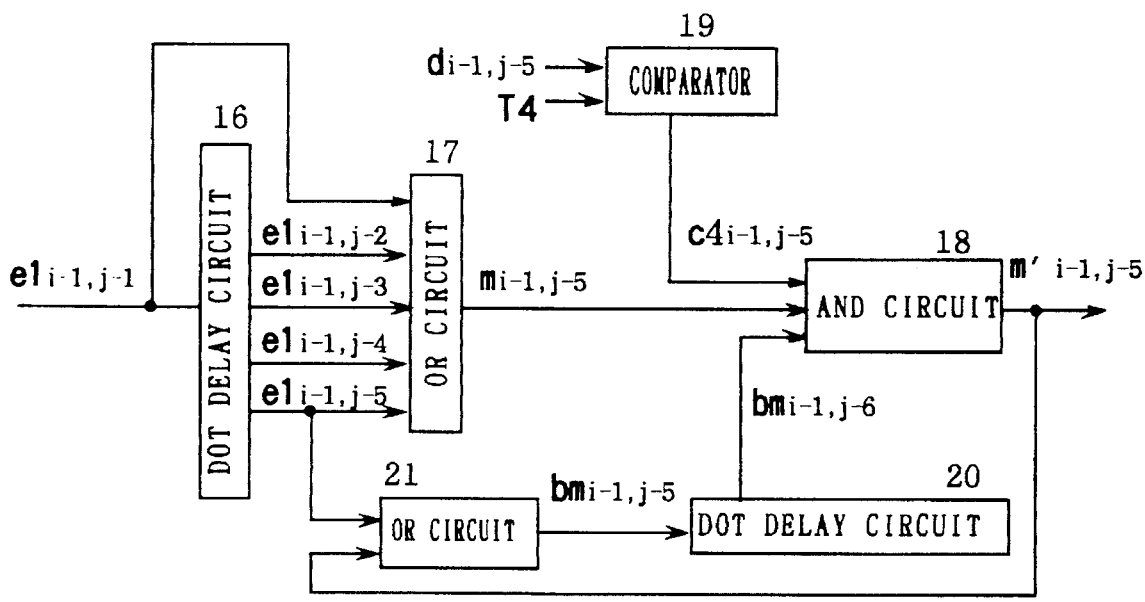

FIG. 17

| THIN LINE DETECTION SIGNAL $h_{i-1,j-5}$ | FIRST EDGE DETECTION SIGNAL $e1_{i-1,j-5}$ | SECOND EDGE DETECTION SIGNAL $e2_{i-1,j-5}$ | HIGH DENSITY LINE DETECTION SIGNAL $m'_{i-1,j-5}$ | DISTANCE CLASSIFYING SIGNAL $f_{i-1,j-5}$ | DENSITY CONVERSION SELECTING SIGNAL $g_{i-1,j-5}$ |
|---|---|---|---|---|---|
| ○ | − | − | − | − | 0 |
| − | ○ | − | − | − | 0 |
| − | − | − | ○ | − | 0 |
| × | × | ○ | × | − | 1 |
| × | × | × | × | 0 | 0 |
| × | × | × | × | 1 | 1 |
| × | × | × | × | 2 | 2 |
| × | × | × | × | 3 | 3 |

FIG. 18A

| −1 | −1 | −1 |
|---|---|---|
| 2 | 2 | 2 |
| −1 | −1 | −1 |

FIG. 18B

| −1 | 2 | −1 |
|---|---|---|
| −1 | 2 | −1 |
| −1 | 2 | −1 |

IMAGE PROCESSING APPARATUS

BACKGROUND OF THE INVENTION

1. Field of the Invention

The present invention relates to an image processing apparatus in which an image is captured from an original document to obtain digital image data and the image data is then subjected to image processing to obtain image data suitably for the type of the apparatus. Examples of such an image processing apparatus include a digital printing press in which perforations are formed in a thermosensitive perforation master sheet in accordance with processed image data, a digital copying apparatus in which a latent image is formed on a light-sensitive material by electrophotography in accordance with processed image data and is transferred to a sheet of paper, and an apparatus in which an image is copied onto thermosensitive paper after image processing. In particular, the present invention relates to an image processing apparatus in which a captured image is converted to binary data to output binary information representing the captured image.

2. Description of the Related Art

When an original document containing both a completely black-and-white image such as a character or a line (hereinafter referred to as a "binary image") and an image having gradation (hereinafter referred to as a "gradation image") is processed by the above-described image processing apparatus, the best results can be obtained by classifying the density of the binary image, using a single threshold, into a maximum density and a minimum density and by carrying out density conversion for the gradation image area to maintain the consistency between the density of an input image and the density of an output image corresponding to the input image, taking into account the characteristics of input and output devices. Therefore, it is necessary to make a judgment as to whether each small area of an image contains a binary image or a gradation image so as to process the areas differently.

Conventionally, an image is divided into pixel blocks of n×n, and the characteristics of each block are extracted. By using the results of the characteristic extraction, it is judged whether each block is a binary image area (an area containing a binary image) or a gradation image area (an area containing a gradation image) (Japanese Patent Application Laid-Open (kokai) No. 3-153167). Hereinafter, this judgment may be referred to as "area judgment". Alternatively, the characteristics of a certain pixel are extracted by using the certain pixel and its peripheral pixels, and the area judgment for each pixel is performed based on the extracted characteristics (Japanese Patent Application Laid-Open (kokai) No. 1-227573).

In the former method, since the area judgment is performed for each block, rectangular shapes corresponding to the blocks are formed at portions where the area judgment is erroneously performed or at portions corresponding to the boundary between a binary image area and a gradation image area. In the latter method, the influence of an erroneous judgment is small. However, a considerable difference in density is produced between a portion in which the area judgment is erroneously performed and a portion in which the area judgment is properly performed, resulting in an unnatural vision.

Also, it is difficult to discriminate a thick line and a black solid portion in a binary image area from a high density portion of a picture in a gradation image area. When parameters for area judgment are adjusted such that the thick line and the black solid portion are judged as binary images, some portions of a picture image are destroyed. When the parameters for area judgment are adjusted such that the high density portion of the picture image is judged as a gradation image, the densities of the thick line and the black solid portion decrease.

SUMMARY OF THE INVENTION

An object of the present invention is to solve the above-described problems of conventional image processing apparatus and to provide an improved image processing apparatus which can provide a high contrast in a binary image area of an original document and can maintain the gradation of an image in a gradation image area of the original document, and which can output an image density signal which does not cause an unnatural vision due to an abrupt change in density.

The present invention provides an image processing apparatus in which images on an original document captured by an image capturing means are classified into a binary image and a gradation image, and the densities of the images are then converted using density conversion curves, which are provided for binary images and gradation images, to output an image signal representing converted images. The image processing apparatus includes means for judging the state of a certain pixel and classifying it as one of a plurality of states between binary images and gradation images, and means for selecting, based on the results of the judgment, one curve from a first density conversion curve for binary images, a second density conversion curve for gradation images and at least one third density conversion curve which interpolates the first and second density conversion curves to convert the density of the certain pixel.

The means for detecting the state of a certain pixel can be realized in various ways as follows.

(1) The sharpness of the edge of a certain pixel is detected based on the densities of pixels adjacent to the certain pixel.

(2) It is judged based on the densities of pixels adjacent to a certain pixel whether the certain pixel is an edge pixel, and the distance between a certain pixel and the edge pixel closest to the certain pixel is calculated.

(3) A judgment as to whether a certain pixel forms a thin line and a judgment as to whether the certain pixel is an edge pixel are performed based on the characteristics of each pixel which are obtained from the sharpness of the edge of the certain pixel, the distance between the certain pixel and the edge pixel, and the thickness of a line including the certain pixel.

In the present invention, when a segment exists wherein a certain pixel is located between a rising edge and a falling edge in density in a main scanning direction or an auxiliary scanning direction, the length of the segment is calculated. The shorter the segment, the larger the probability that the segment forms a part of a character. In the present invention, the distance between a certain pixel and an edge pixel closest to the certain pixel is calculated. The shorter the distance, the larger the probability that the certain pixel forms an image of a character. The longer the distance, the larger the possibility that the certain pixel forms a gradation image.

In the present invention, not only a first density conversion curve for binary images and a second density conversion curve for gradation images but also a suitable number of third density conversion curves which interpolate the first and second density conversion curves are provided.

Based on few characteristic values which are predicted for each pixel in the above-described manner, the density conversion curves are selectively used. When the characteristic values indicate a strong likelihood that a detected image is a binary image, the first density conversion curve for binary images is selected. When the characteristic values indicate a strong likelihood that the detected image is a gradation image, the second density conversion curve for gradation images is selected. When it is judged that the detected image is neither a binary image nor a gradation image, one of the third density conversion curves which interpolate the first and second density conversion curves is selected based on the probability of being a binary image and the probability of being a gradation image. The density of the detected image is converted using the selected density conversion curve. With this operation, the density of the output image does not abruptly change even when the characteristic values indicate neither the possibility of being a binary image nor the possibility of being a gradation image, or when an area is erroneously judged because of characteristic values which only represent the characteristics of an image in a narrow area.

Also, by selecting a density conversion curve closer to the first density conversion curve for binary images when approaching the edge and selecting a density conversion curve closer to the second density conversion curve for gradation images when separating from the edge, thick characters and black solid portions can be made completely black, while the gradation of a portion of a gradation image where the density is high can be maintained.

In the image processing apparatus according to the present invention, abrupt changes in the density of an output image due to an erroneous judgment of an area can be reduced so that a viewer feels a minimized unnaturality. Even when an original document containing both character images such as characters and lines and gradation images such as pictures, an image density signal which is highly consistent with the original document can be output.

Also, the image processing apparatus according to the present invention stores density conversion information representing a plurality of density conversion curves which interpolate the first density conversion curve for binary images and the second density conversion curve for gradation images. Accordingly, thick characters and black solid portions can be reproduced as being completely black in appearance, because the thick characters and black solid portions can have high densities at their edges. Since the density of each gradation image is controlled to gradually have gradation away from the edges, the gradation of a high density portion of the gradation image can be maintained.

BRIEF DESCRIPTION OF THE DRAWINGS

Various other objects, features and many of the attendant advantages of the present invention will be readily appreciated as the same becomes better understood by referring to the following detailed description of the preferred embodiments when considered in connection with the accompanying drawings, in which:

FIG. 4 is a block diagram of an edge detection circuit used in the first embodiment;

FIGS. 5A–5D are charts showing coefficient matrixes used in the edge detection circuit;

FIG. 11 is a table showing rules which are used in the second embodiment to judge characteristics of each pixel;

FIG. 13 is a block diagram of an edge detection circuit used in the third embodiment;

FIG. 14 is a block diagram of a high density line detection circuit used in the third embodiment;

FIG. 17 is a table showing rules which are used in the third embodiment to judge characteristics of each pixel; and FIGS. 18A and 18B are charts showing coefficient matrixes used in a thin line detection circuit according to the third embodiment.

DETAILED DESCRIPTION OF THE PREFERRED EMBODIMENTS

Figure 1:
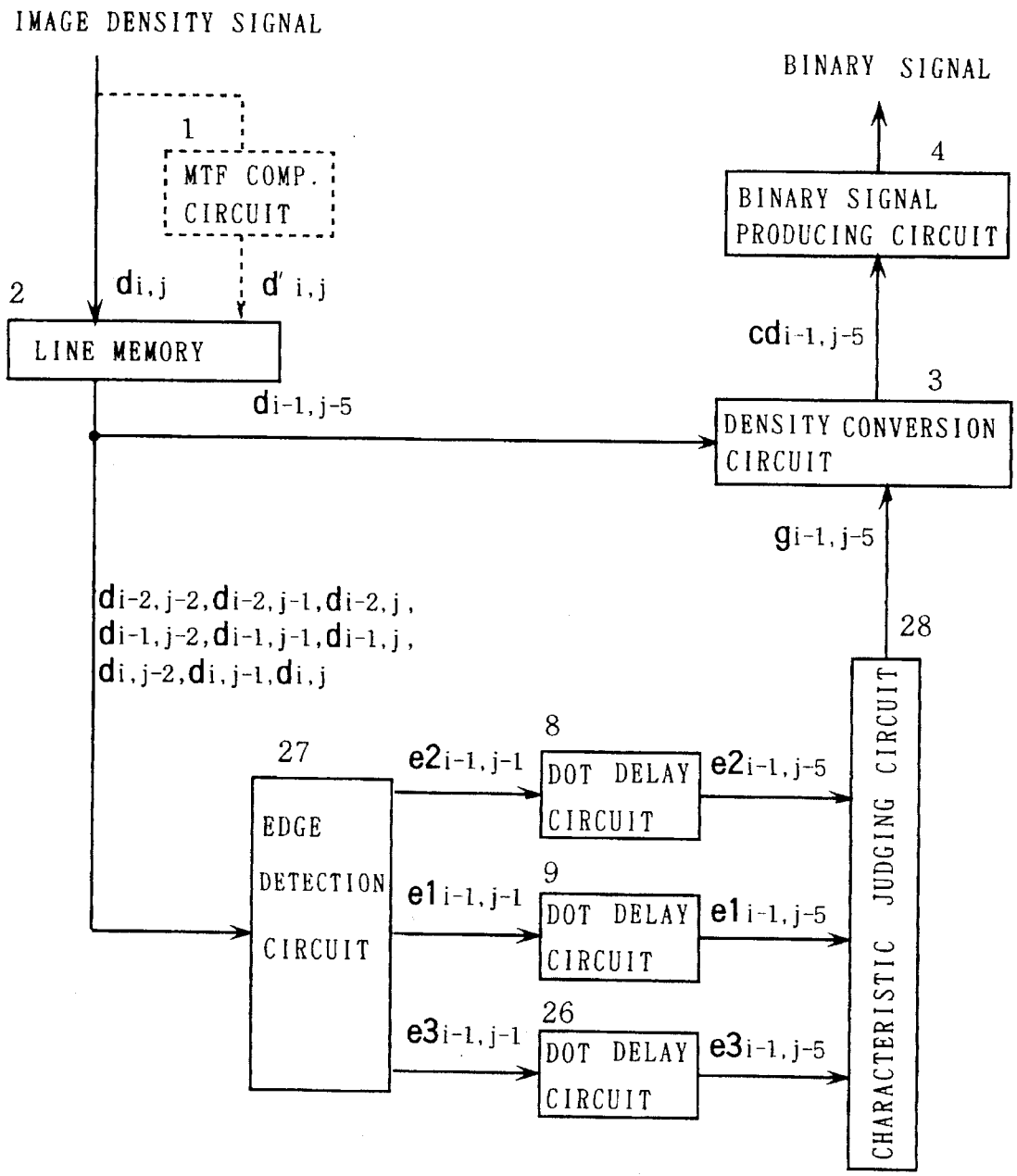
FIG. 1 is a block diagram of an image processing apparatus according to a first embodiment of the present invention.

Embodiments of the present invention will now be described in more detail with reference to the drawings.
First Embodiment:

FIG. 1 is a block diagram of an image processing apparatus according to a first embodiment of the present invention. Light is irradiated on an original document, and light reflected by the original document is detected by an unillustrated line sensor, such as a CCD, which serves as an image capturing means. The detected light is converted to an electric signal (image density signal) and the converted electric signal is output. An image density signal $d_{i,j}$ representing the density of an image captured by the image capturing means is output from the image capturing means.

The image density signal output from the image capturing means is directly input to a line memory 2, or input to the line memory 2 via an MTF compensation circuit 1 illustrated by a broken line. The image density signal output from the image capturing means undergoes a compensation process in the MTF compensation circuit 1 so that an image density signal which closely represents the original image is output from the MTF compensation circuit 1.

Figures 2, 3:
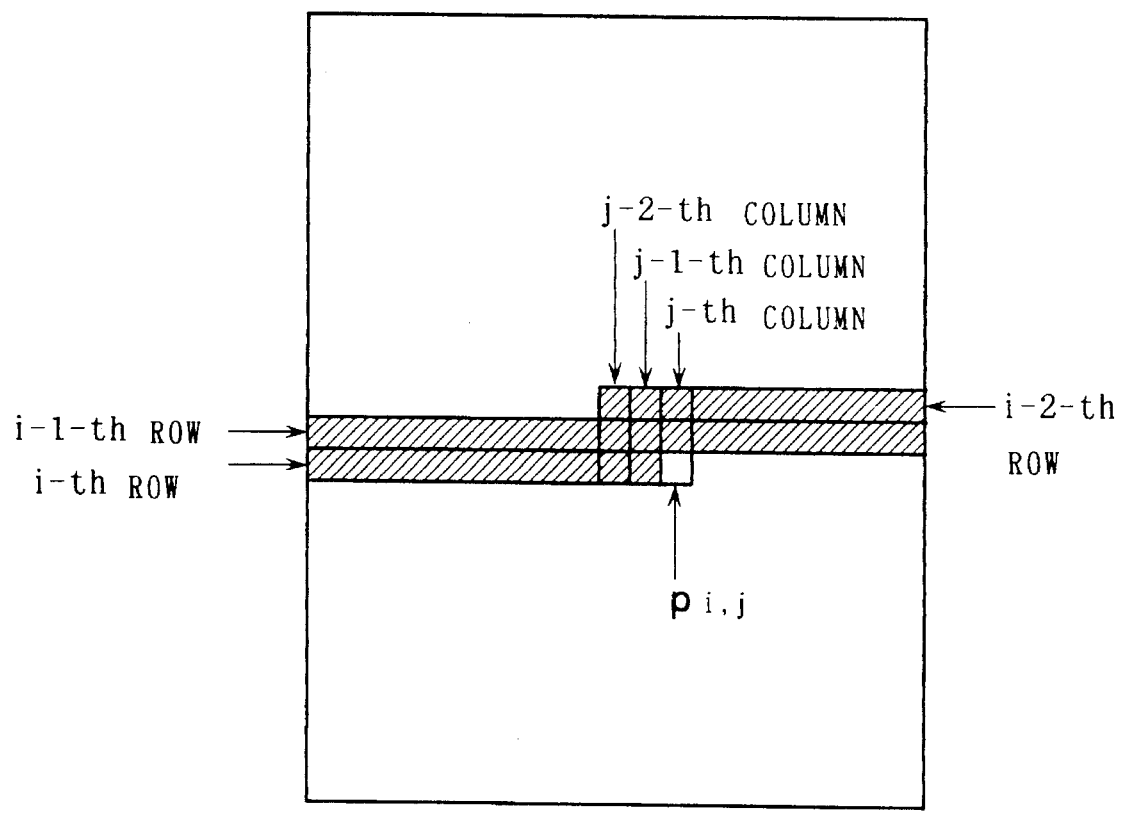
FIG. 2 is a diagram showing a coefficient matrix used in an MTF compensation circuit according to the first embodiment.
FIG. 3 is a diagram showing the positions of pixels on an original document which corresponds to image density signals stored in a line memory in the first embodiment.

When the MTF compensation circuit 1 is used, the densities of pixels in an image are multiplied by corresponding coefficients in an MTF compensation coefficient matrix shown in FIG. 2. The multiplied densities are summed by a convolution calculation to obtain a compensated image signal $d'_{i,j}$, which is then input to the line memory 2.

FIG. 3 shows the positions of pixels on an original document which correspond to image density signals stored in the line memory 2. $p_{i,j}$ represents a newest pixel corresponding to a newest image density signal output from the image capturing means. j is a pixel number in the main scanning direction while i is a pixel number in the auxiliary scanning direction. Therefore, $p_{i,j}$ is a pixel which is located at an i-th position in the auxiliary scanning direction and at a j-th position in the main scanning direction. The density of the pixel $p_{i,j}$ is represented as $d_{i,j}$. The line memory 2 stores image density signals for pixels in a hatched area, wherein the number of the pixels is greater, by two, than the number of pixels in two lines extending in the main scanning direction.

Image density signals ($d_{i,j}$, $d_{i,j-1}$, $d_{i,j-2}$, $d_{i-1,j}$, $d_{i-1,j-1}$, $d_{i-1,j-2}$, $d_{i-2,j}$, $d_{i-2,j-1}$, and $d_{i-2,j-2}$) output from the line memory 2 form a matrix of 3×3 in which pixel $p_{i-1,j-1}$ is centrally located.

As shown in FIG. 1, image density signal $d_{i-1,j-5}$ output from the line memory 2 is input to a density conversion circuit 3. Image density signals ($d_{i,j}$, $d_{i,j-1}$, $d_{i,j-2}$, $d_{i-1,j}$, $d_{i-1,j-1}$, $d_{i-1,j-2}$, $d_{i-2,j}$, $d_{i-2,j-1}$, and $d_{i-2,j-2}$) output from the line memory 2 are input to an edge detection circuit 27. The edge detection circuit 27 judges whether the density changes at a certain pixel with respect to the densities of pixels adjacent to the certain pixel.

FIG. 4 shows the detail of the edge detection circuit 27. A calculation circuit 13 performs a convolution calculation using edge detection coefficient matrixes for lateral direction, longitudinal or vertical direction, and two oblique directions perpendicularly intersecting each other shown in FIGS. 5A, 5B, 5C and 5D. The largest one of the absolute values of four obtained values is output as an edge signal $e_{i-1,j-1}$, and is input to comparators 14, 15 and 25.

The comparator 15 outputs a first edge detection signal $e1_{i-1,j-1}$. When the input edge signal $e_{i-1,j-1}$ is equal to or greater than a first edge threshold T2, the first edge detection signal $e1_{i-1,j-1}$ is a valid signal which indicates that the pixel is an edge pixel. When the input edge signal $e_{i-1,j-1}$ is less than the first edge threshold T2, the first edge detection signal $e1_{i-1,j-1}$ is an invalid signal which indicates that the pixel is not an edge pixel. The first edge threshold T2 is determined to only detect large sharp edges (large changes in density) which hardly appear in gradation images.

The comparator 14 outputs a second edge detection signal $e2_{i-1,j-1}$. When the input edge signal $e_{i-1,j-1}$ is equal to or greater than a second edge threshold T3, the second edge detection signal $e2_{i-1,j-1}$ is a valid signal. When the input edge signal $e_{i-1,j-1}$ is less than the second edge threshold T3, the second edge detection signal $e2_{i-1,j-1}$ is an invalid signal. The second edge threshold T3 is determined to be smaller than the first edge threshold T2 so as to detect intermediate sharp edges (slightly large changes in density).

The comparator 25 outputs a third edge detection signal $e3_{i-1,j-1}$. When the input edge signal $e_{i-1,j-1}$ is equal to or greater than a third edge threshold T8, the third edge detection signal $e3_{i-1,j-1}$ is a valid signal. When the input edge signal $e_{i-1,j-1}$ is less than the third edge threshold T8, the third edge detection signal $e3_{i-1,j-1}$ is an invalid signal. The third edge threshold T8 is set to be smaller than the second edge threshold T3 so as to detect small sharp edges (almost no changes in density).

As shown in FIG. 1, the edge detection signals are input to dot delay circuits 8, 9 and 26 for matching with the timing of density conversion for image density signal $d_{i-1,j-5}$ of a pixel to be processed.

The first edge detection signal $e1_{i-1,j-5}$, the second edge detection signal $e2_{i-1,j-5}$ and the third edge detection signal $e3_{i-1,j-5}$ output from the dot delay circuits 8, 9 and 26 are input to a characteristic judging circuit 28. The characteristic judging circuit 28 determines a density conversion selecting signal $g_{i-1,j-5}$ based on the first edge detection signal $e1_{i-1,j-5}$, the second edge detection signal $e2_{i-1,j-5}$ and the third edge detection signal $e3_{i-1,j-5}$, in accordance with rules shown in FIG. 6.

The density conversion selecting signal $g_{i-1,j-5}$ is determined such that a density conversion curve is selected taking account of the following.

1. Edge pixels mainly exist in binary image areas.
2. As the sharpness of an edge (change in the density) becomes larger, the probability of being a binary image increases, and as the sharpness (change in the density) becomes smaller, the probability of being a gradation image increases.

Figures 6, 7:
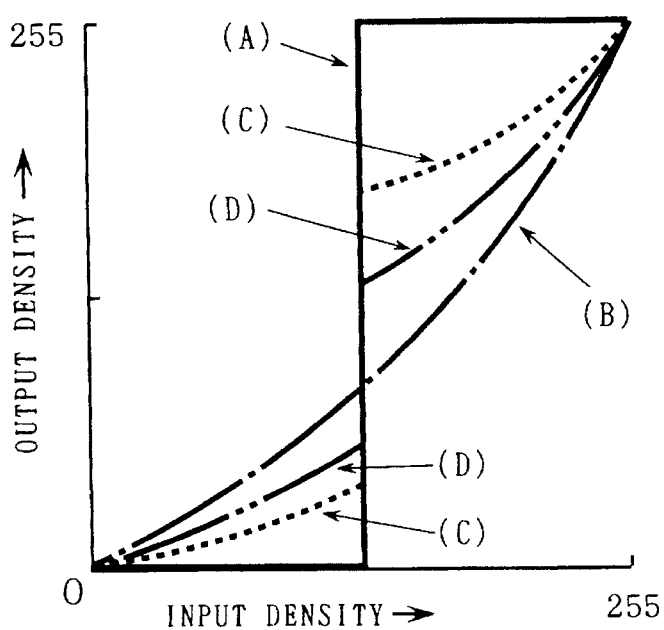
FIG. 6 is a table showing rules which are used in the first embodiment to judge characteristics of each pixel.
FIG. 7 is a graph showing density conversion curves used in a density conversion circuit according to the first embodiment.

In the table shown in FIG. 6, for a signal taking one of two values, symbol o indicates that the signal is valid, symbol x indicates that the signal is invalid, and symbol-indicates that the signal is ignored. For a signal taking one of three or more values, a numeral represents the value of the signal. The value of the density conversion selecting signal $g_{i-1,j-5}$ has the following meaning:

when $g_{i-1,j-5}=0$, a binary image, when $g_{i-1,j-5}=3$, a gradation image, when $g_{i-1,j-5}=1$, probably a binary image, and when $g_{i-1,j-5}=2$, probably a gradation image.

The density conversion circuit 3 includes four density conversion curves shown in FIG. 7, i.e., a density conversion curve A (solid line) for binary images which converts an input density signal to a binary signal i.e., to the maximum or minimum value, a density conversion curve B (alternate long and short dash line) for gradation images which closely copies the gradation of an input density signal to an output density signal, a density conversion curve (C) (broken line) close to the density conversion curve (A) for binary images, and a density conversion curve (D) (alternate long and two short dashes line) close to the density conversion curve (B) for gradation images. The density conversion curves (C) and (D) interpolate the density conversion curves (A) and (B).

Based on the value of the density conversion selecting signal $g_{i-1,j-5}$ input from the characteristic judging circuit 28, a density conversion curve is selected in accordance with the following rules:

when $g_{i-1,j-5}=0$, density conversion curve A for binary image, when $g_{i-1,j-5}=3$, density conversion curve B for gradation image, when $g_{i-1,j-5}=1$, density conversion curve C which interpolates the density conversion curves A and B; and when $g_{i-1,j-5}=2$, density conversion curve D which interpolates the density conversion curves A and B. The image density signal $d_{i-1,j-5}$ is subjected to density conversion using a selected density conversion curve to output a converted density signal $cd_{i-1,j-5}$.

Actually, the density conversion circuit 3 has four data conversion tables corresponding to the above-described four density conversion curves. The data conversion tables are selectively used based on the value of the density conversion selecting signal $g_{i-1,j-5}$ input from the characteristic judging circuit 28, and the image density signal $d_{i-1,j-5}$ is converted to the density signal $cd_{i-1,j-5}$ with reference to a selected data conversion table.

The converted density signal $cd_{i-1,j-5}$ output from the density conversion circuit 3 is input to a binary signal producing circuit 4. The binary signal producing circuit 4 converts the converted density signal $cd_{i-1,j-5}$ to a binary signal by an error diffusion method.

In the resent embodiment, coefficient matrixes of 3×3 are used for the edge detection. The accuracy of the edge detection can be increased by changing the size of the matrixes to n×m (n>0, m>0, n and m are integers), changing the coefficients, or increasing the number of the matrixes.

Although two additional density conversion curves which interpolate the density conversion curve for binary images and the density conversion curve for gradation images are used in the present embodiment, the number of the additional density conversion curves can be reduced from two to one. Also, the number of classes into which the sharpness of an edge is classified may be increased by adding comparators having different thresholds to the edge detection circuit 27, thereby providing three or more density conversion curves which interpolate the density conversion curve for binary images and the density conversion curve for gradation images.

Second Embodiment:

Next, an image processing apparatus according to a second embodiment will be described with reference to FIG. 8.

Like the first embodiment, image density signals ($d_{i,j}$, $d_{i,j-1}$, $d_{i,j-2}$, $d_{i-1,j}$, $d_{i-1, j-1}$, $d_{i-1,j-2}$, $d_{i-2,j}$, $d_{i-2,j-1}$, and $d_{i-2,j-2}$) output from the line memory 2 form a matrix of 3×3 in which pixel $p_{i-1,j-1}$ is centrally located.

Figure 8:
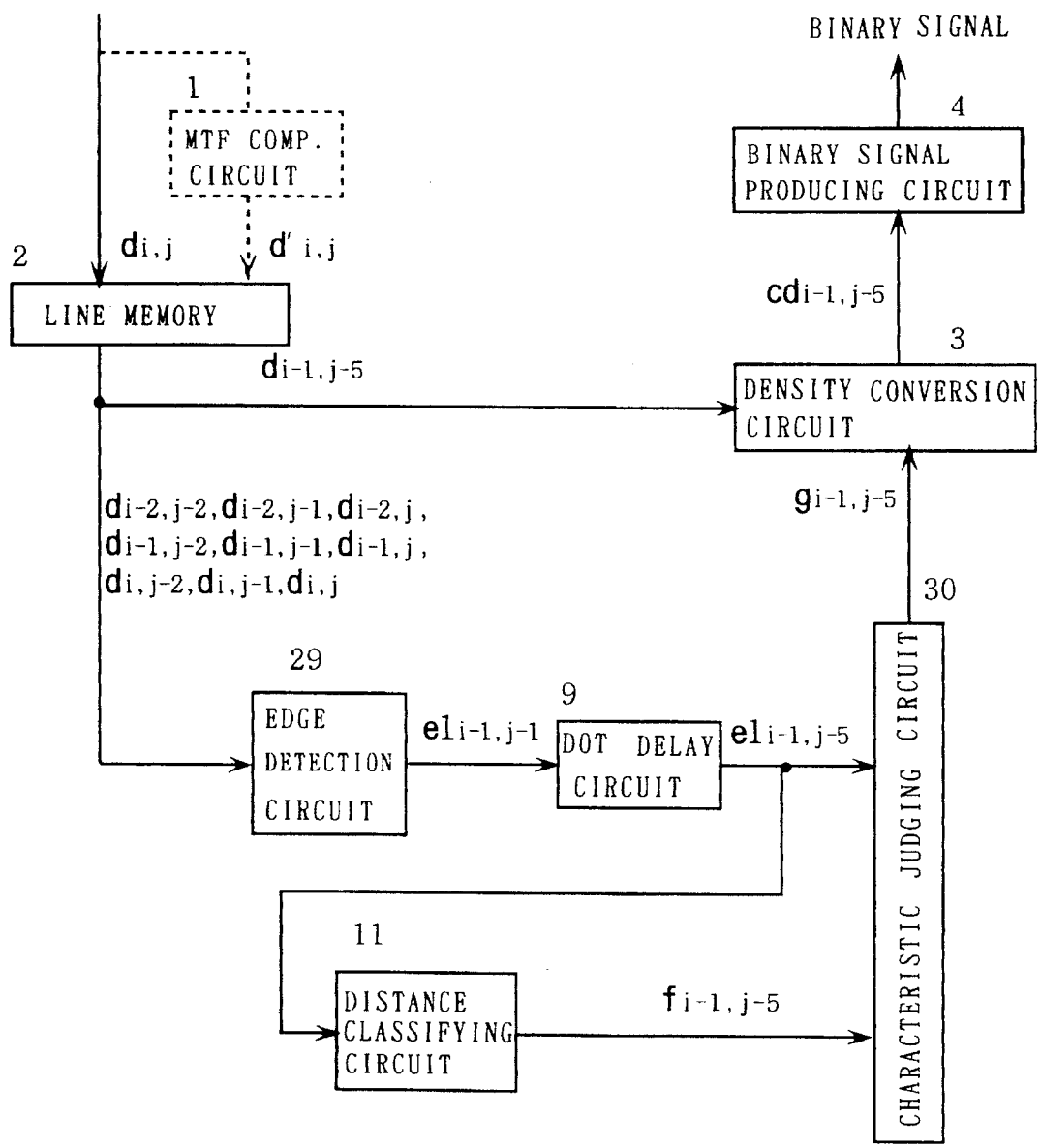
FIG. 8 is a block diagram of an image processing apparatus according to a second embodiment of the present invention.

As shown in FIG. 8, image density signal $d_{i-1,j-5}$ output from the line memory 2 is input to a density conversion circuit 3. Image density signals ($d_{i,j}$, $d_{i,j-1}$, $d_{i,j-2}$, $d_{i-1,j}$, $d_{i-1,j-1}$, $d_{i-1,j-2}$, $d_{i-2,j}$, $d_{i-2,j-1}$, and $d_{i-2,j-2}$) output from the line memory 2 are input to an edge detection circuit 29.

Figure 9:
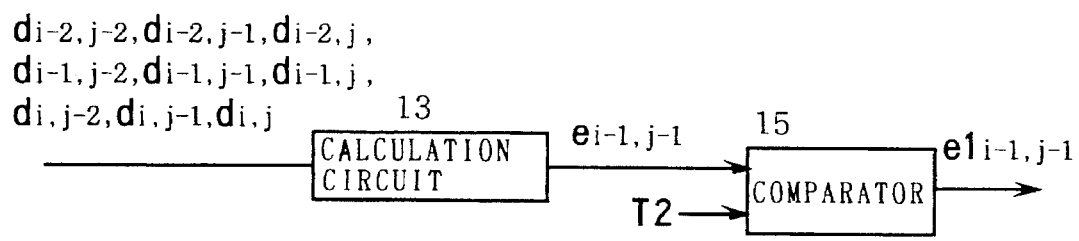
FIG. 9 is a block diagram of an edge detection circuit used in the second embodiment.

FIG. 9 shows the detail of the edge detection circuit 29. A calculation circuit 13 performs a convolution calculation using edge detection coefficient matrixes for lateral direction, longitudinal or vertical direction, and two oblique directions perpendicularly intersecting each other shown in FIGS. 5A, 5B, 5C and 5D, like the first embodiment. The largest one of the absolute values of four obtained values is output as an edge signal $e_{i-1,j-1}$, and is input to a comparator 15.

The comparator 15 outputs a first edge detection signal $e1_{i-1,j-1}$. When the input edge signal $e_{i-1,j-1}$ is equal to or greater than a first edge threshold T2, the first edge detection signal $e1_{i-1,j-1}$ is a valid signal which indicates that the pixel is an edge pixel. When the input edge signal $e_{i-1,j-1}$ is less than the first edge threshold T2, the first edge detection signal $e1_{i-1,j-1}$ is an invalid signal which indicates that the pixel is not an edge pixel. The first edge threshold T2 is determined to only detect large sharp edges (large changes in density) which hardly appear in gradation images.

Figure 10:
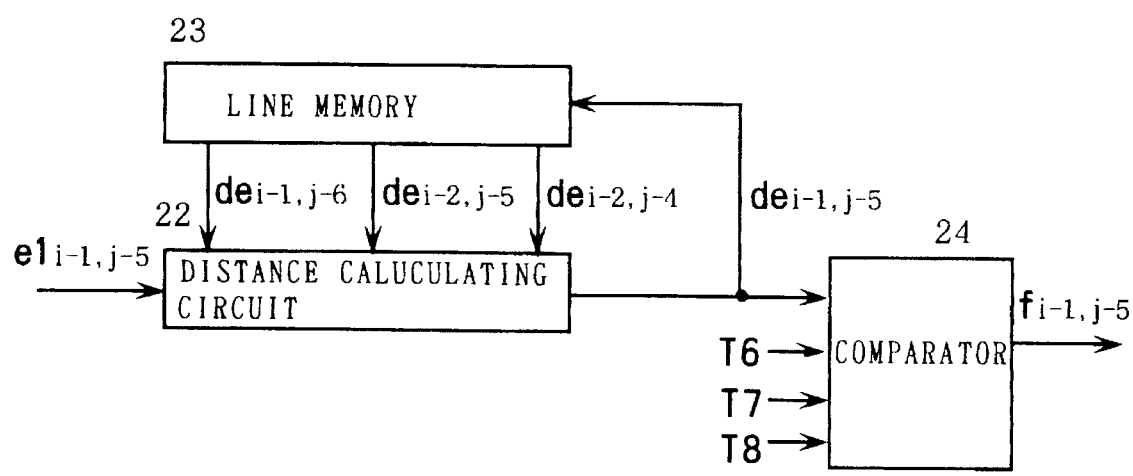
FIG. 10 is a block diagram of a distance classifying circuit used in the second embodiment.

As shown in FIG. 8, the first edge detection signal $e1_{i-1,j-5}$ output from the dot delay circuit 9 is input to a characteristic judging circuit 30 and a distance classifying circuit 11. The distance classifying circuit 11 calculates the distance between a certain pixel and an edge pixel and classifies the distance. FIG. 10 shows the detail of the distance classifying circuit 11. The line memory 23 stores distance data representing the distance between each pixel in a single line and an edge pixel.

Figure 16:
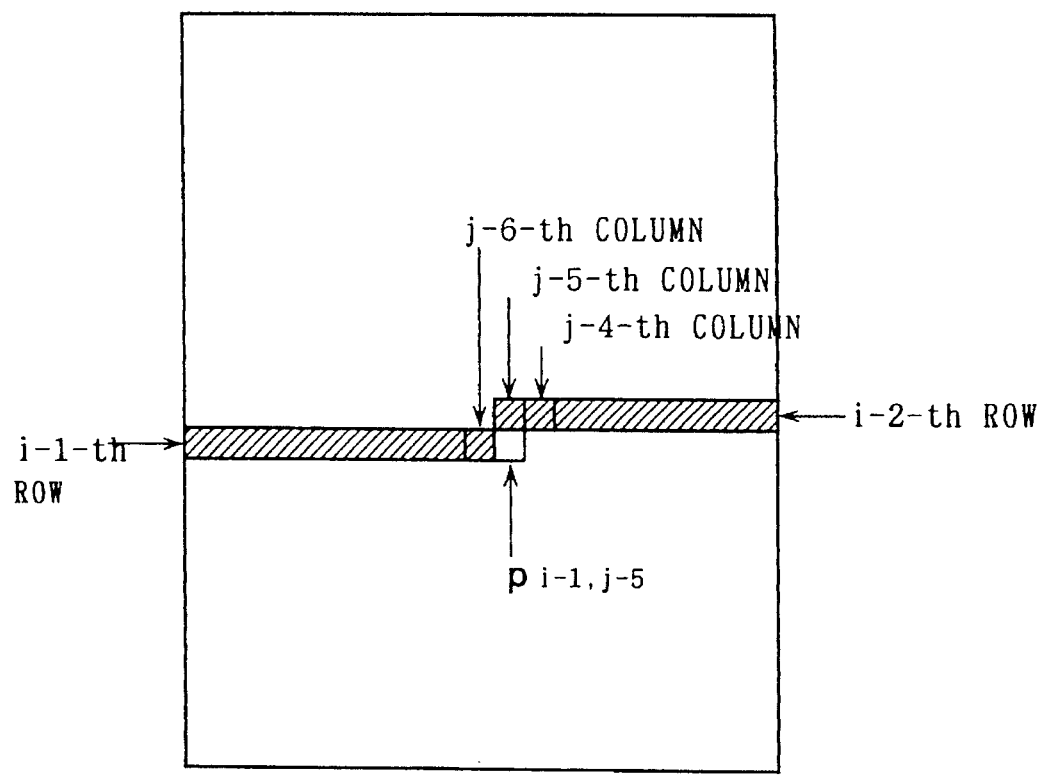
FIG. 16 is a diagram showing the positions of pixels on an original document which correspond to the distances between an edge pixel and pixels stored in a line memory used in the third embodiment.

FIG. 16 shows the positions of the pixels on an original document which correspond to the distances between the pixels stored in the line memory and the corresponding edge pixels. The first edge detection signal $e1_{i-1,j-5}$ is input to a distance counting circuit 22 in which the distance $de_{i-1,j-5}$ between the pixel $p_{i-1,j-5}$ and the corresponding edge is calculated based on the distance $de_{i-1,j-6}$ between the left-hand pixel $p_{i-1,j-6}$ and the corresponding edge, the distance $de_{i-2,j-5}$ between the upper pixel $p_{i-2,j-5}$ and the corresponding edge, and the distance $de_{i-2,j-4}$ between the right-upper pixel $p_{i-2,j-4}$ and the corresponding edge, as follows:

when $e1_{i-1,j-5}=1$, $de_{i-1,j-5}=0$, and when $e1_{i-1,j-5}=0$, $de_{i-1,j-5}=\min(de_{i-1,j-6}, de_{i-2,j-5}, de_{i-2,j-4})+1$.

The distances $de_{i-1,j-6}$, $de_{i-2,j-5}$, $de_{i-2,j-4}$ are read out from the line memory 23, and the distance $de_{i-1,j-5}$ is newly stored in the line memory 23. The distance $de_{i-1,j-5}$ from the edge is input to a comparator 24 and is classified based on the following rules:

when $de_{i-1,j-5} \leq T6$, $f_{i-1,j-5}=0$,
when $T6 < de_{i-1,j-5} \leq T7$, $f_{i-1,j-5}=1$,
when $T7 < de_{i-1,j-5} \leq T8$, $f_{i-1,j-5}=2$, and
when $T8 < de_{i-1,j-5}$, $f_{i-1,j-5}=3$.

The distance classifying signal $f_{i-1,j-5}$ is input to the characteristic judging circuit 30.

The characteristic judging circuit 30 determines a density conversion selecting signal $g_{i-1,j-5}$ based on the first edge detection signal $e1_{i-1,j-5}$ and the distance classifying signal $f_{i-1,j-5}$, in accordance with rules shown in FIG. 11. The density conversion selecting signal $g_{i-1,j-5}$ is determined such that a density conversion curve is selected taking account of the following.

1. Edge pixels mainly exist in binary image areas.
2. As the distance between a certain pixel and an edge pixel closest to the certain pixel becomes shorter, the probability that the image is a binary image increases, and as the distance between the certain pixel and the edge pixel closest to the certain pixel becomes longer, the probability of being a gradation image increases.

In the table shown in FIG. 11, for a signal taking one of two values, symbol o indicates that the signal is valid, symbol x indicates that the signal is invalid, and symbol -indicates that the signal is ignored. For a signal taking one of three or more values, a numeral represents the value of the signal. The value of the density conversion selecting signal $g_{i-1,j-5}$ has the following meaning:

when $g_{i-1,j-5}=0$, a binary image, when $g_{i-1,j-5}=3$, a gradation image, when $g_{i-1,j-5}=1$, probably a binary image, and when $g_{i-1,j-5}=2$, probably a gradation image.

The density conversion circuit 3 includes four density conversion curves, like in the first embodiment. Based on the value of the density conversion selecting signal $g_{i-1,j-5}$ input from the characteristic judging circuit 30, a density conversion curve is selected in accordance with the following rules:

when $g_{i-1,j-5}=0$, density conversion curve A for binary image, when $g_{i-1,j-5}=3$, density conversion curve B for gradation image, when $g_{i-1,j-5}=1$, density conversion curve C which interpolates the density conversion curves A and B and which is close to the density conversion curve A; and when $g_{i-1,j-5}=2$, density conversion curve D which interpolates the density conversion curves A and B and which is close to the density conversion curve B.

The image density signal $d_{i-1,j-5}$ is subjected to density conversion using a selected density conversion curve to output a converted density signal $cd_{i-1,j-5}$.

Actually, the density conversion circuit 3 has four data conversion tables corresponding to the above-described four density conversion curves. The data conversion tables are selectively used based on the value of the density conversion selecting signal $g_{i-1,j-5}$ input from the characteristic judging circuit 30, and the image density signal $d_{i-1,j-5}$ is converted to the density signal $cd_{i-1,j-5}$ with reference to a selected data conversion table.

The converted density signal $cd_{i-1,j-5}$ output from the density conversion circuit 3 is input to a binary signal producing circuit 4. The binary signal producing circuit 4 converts the converted density signal $cd_{i-1,j-5}$ to a binary signal by an error diffusion method. In the resent embodiment, the accuracy of the edge detection can be increased in the same manner as that used in the first embodiment. Although two additional density conversion curves which interpolate the density conversion curve for binary images and the density conversion curve for gradation images are used in the present embodiment, the number of the additional density conversion curves can be reduced from two to one. Also, the number of classes into which the distances are classified by the distance classifying circuit 11 may be increased so as to provide three or more density conversion curves which interpolate the density conversion curve for binary images and the density conversion curve for gradation images.

Third Embodiment:

Next, an image processing apparatus according to a third embodiment will be described with reference to FIG. 12.

Like the first embodiment, image density signals ($d_{i,j}$, $d_{i,j-1}$, $d_{i,j-2}$, $d_{i-1,j}$, $d_{i-1,j-1}$, $d_{i-1,j-2}$, $d_{i-2,j}$, $d_{i-2,j-1}$, and $d_{i-2,j-2}$) output from the line memory 2 form a matrix of 3×3 in which pixel $p_{i-1,j-1}$ is centrally located.

Figure 12:
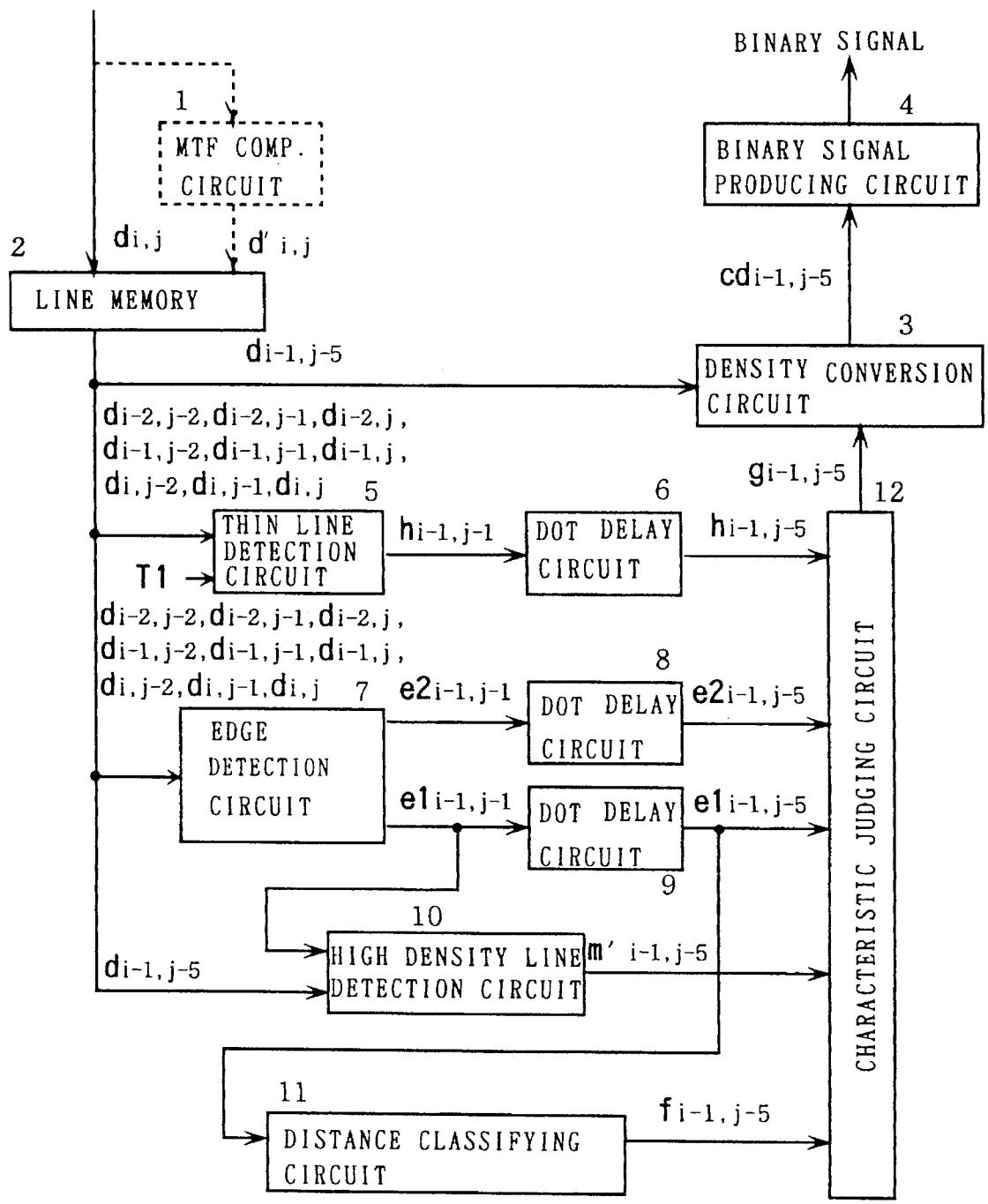
FIG. 12 is a block diagram of an image processing apparatus according to a third embodiment of the present invention.

As shown in FIG. 12, image density signal $d_{i-1,j-5}$ output from the line memory 2 is input to a high density line detection circuit 10 and a density conversion circuit 3. Image density signals ($d_{i,j}$, $d_{i,j-1}$, $d_{i,j-2}$, $d_{i-1,j}$, $d_{i-1,j-1}$, $d_{i-1,j-2}$, $d_{i-2,j}$, $d_{i-2,j-1}$, and $d_{i-2,j-2}$) output from the line memory 2 are input to a thin line detection circuit 5, and an edge detection circuit 7. The thin line detection circuit 5 detects whether a certain pixel is a part of a thin line or not. In the thin line detection circuit 5, a convolution calculation is performed using thin line detection coefficient matrixes for the lateral direction (main scanning direction) and the longitudinal direction (auxiliary scanning direction) shown in FIGS. 18A and 18B. The larger one of the absolute values of two obtained values is compared with a threshold T1. When the lager one of the absolute values is equal to or greater than the threshold T1, a thin line detection signal $h_{i-1,j-1}$ indicating a validity (i.e., a signal indicating that the detected image is a thin line). When the lager one of the absolute values is less than the threshold T1, a thin line detection signal $h_{i-1,j-1}$ indicating an invalidity (i.e., a signal indicating that the detected image is not a thin line). The thin line detection signal $h_{i-1,j-1}$ is input to a dot delay circuits 6 for matching with the timing of density conversion for image density signal $d_{i-1,j-5}$ of a pixel to be processed. The thin line detection signal $h_{i-1,j-5}$ output from the dot delay circuit 6 is input to a characteristic judging circuit 12.

FIG. 13 shows the detail of the edge detection circuit. A calculation circuit 13 performs a convolution calculation using edge detection coefficient matrixes for lateral direction, longitudinal or vertical direction, and two oblique directions perpendicularly intersecting each other shown in FIGS. 5A, 5B, 5C and 5D, like the first embodiment. The largest one of the absolute values of four obtained values is output as an edge signal $e_{i-1,j-1}$, and is input to comparators 14 and 15.

The comparator 15 outputs a first edge detection signal $e1_{i-1,j-1}$. When the input edge signal $e_{i-1,j-1}$ is equal to or greater than a first edge threshold T2, the first edge detection signal $e1_{i-1,j-1}$ is a valid signal which indicates that the pixel is an edge pixel. When the input edge signal $e_{i-1,j-1}$ is less than the first edge threshold T2, the first edge detection signal $e1_{i-1,j-1}$ is an invalid signal which indicates that the pixel is not an edge pixel. The first edge threshold T2 is determined to only detect large sharp edges (large changes in density) which hardly appear in gradation images.

The comparator 14 outputs a second edge detection signal $e2_{i-1,j-1}$. When the input edge signal $e_{i-1,j-1}$ is equal to or greater than a second edge threshold T3, the second edge detection signal $e2_{i-1,j-1}$ is a valid signal. When the input edge signal $e_{i,j-1}$ is less than the second edge threshold T3, the second edge detection signal $e2_{i-1,j-1}$, is an invalid signal. The second edge threshold T3 is determined to be smaller than the first edge threshold T2 so as to detect intermediate sharp edges (slightly large changes in density).

FIG. 14 shows the detail structure of the high density line detection circuit. The high density line detection circuit is used to identify a line having a predetermined thickness and density. That is, the circuit detects whether a certain pixel is located between an edge pixel at a rising edge and another edge pixel at a falling edge and whether the density of the certain pixel is high.

The first edge detection signal $e1_{i-1,j-1}$ is input to a dot delay circuit 16 including four delay stages, and an OR circuit 17. Simultaneously, the outputs $e1_{i-1,j-2}$, $e1_{i-1,j-3}$, $e1_{i-1,j-4}$ and $e1_{i-1,j-5}$ of the dot delay circuit 16 are input to the OR circuit 17 so that an edge signal $m_{i-1,j-5}$ for a pixel located ahead is output from the OR circuit 17.

The comparator 19 outputs a high density detection signal $c4_{i-1,j-1}$ indicating a validity when the input image density signal $d_{i-1,j-5}$ is equal to or greater than a threshold T4. The comparator 19 outputs a high density detection signal $c4_{i-1,j-5}$ indicating an invalidity when the input image density signal $d_{i-1,j-5}$ is less than a threshold T4. The output $e1_{i-1,j-5}$ of the delay circuit 16 and the high density line detection signal $m'_{i-1,j-5}$ are input to an OR circuit 21. An edge/high density line detection signal $bm_{i-1,j-5}$ is output from the OR circuit 21 and is input to a dot delay circuit 20 so that an edge/high density line detection signal $bm_{i-1,j-6}$ for a pixel located behind is output from the dot delay circuit 20.

The edge signal $m_{i-1,j-5}$ for the pixel located ahead, the high density detection signal $c4_{i-1,j-5}$, and the edge/high density line detection signal $bm_{i-1,j-6}$ for the pixel located behind are input to an AND circuit 18. A high density line detection signal $m'_{i-1,j-5}$ is output from the AND circuit 18, and is input to the OR circuit 21 and the characteristic judging circuit 12.

Figure 15:
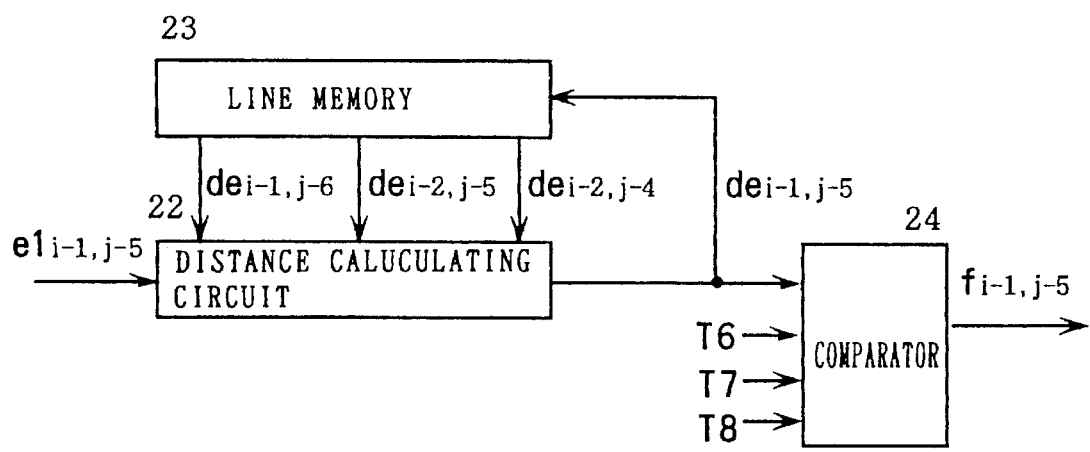
FIG. 15 is a block diagram of a distance classifying circuit used in the third embodiment.

The distance classifying circuit 11 calculates the distance between a certain pixel and an edge pixel and classifies the distance. FIG. 15 shows the detail of the distance classifying circuit 11. The line memory 23 stores distance data representing the distances between pixels in a single line and an edge pixel.

FIG. 16 shows the positions of the pixels on an original document which correspond to the distances between the pixels stored in the line memory and the corresponding edge pixels. The first edge detection signal $e1_{i-1,j-5}$ is input to a distance counting circuit 22 in which the distance $de_{i-1,j-5}$ between the pixel $p_{i-1,j-5}$ and the corresponding edge is calculated based on the distance $de_{i-1,j-6}$ between the left-hand pixel $p_{i-1,j-6}$ and the corresponding edge, the distance $de_{i-2,j-5}$ between the upper pixel $p_{i-2,j-5}$ and the corresponding edge, and the distance $de_{i-2,j-4}$ between the right-upper pixel $p_{i-2,j-4}$ and the corresponding edge, as follows:

when $e1_{i-1,j-5}=1$, $de_{i-1,j-5}=0$, and when $e1_{i-1,j-5}=0$, $de_{i-1,j-5}=\min(de_{i-1,j-6}, de_{i-2,j-5}, de_{i-2,j-4})+1$.

The distances $de_{i-1,j-6}$, $de_{i-2,j-5}$, $de_{i-2,j-4}$ are read out from the line memory 23, and the distance $de_{i-1,j-5}$ is newly stored in the line memory 23. The distance $de_{i-1,j-5}$ from the edge is input to a comparator 24 and is classified based on the following rules:

when $de_{i-1,j-5} < T6$, $f_{i-1,j-5} = 0$,
when $T6 \leq de_{i-1,j-5} < T7$, $f_{i-1,j-5} = 1$,
when $T7 \leq de_{i-1,j-5} < T8$, $f_{i-1,j-5} = 2$, and
when $T8 \leq de_{i-1,j-5}$, $f_{i-1,j-5} = 3$.

The distance classifying signal $f_{i-1,j-5}$ is input to the characteristic judging circuit 12.

The characteristic judging circuit 12 determines a density conversion selecting signal $g_{i-1,j-5}$ based on the thin line detection signal $h_{i-1,j-5}$, the first edge detection signal $e1_{i-1,j-5}$, the second edge detection signal $e2_{i-1,j-5}$, the high density line detection signal $m'_{i-1,j-5}$ and the distance classifying signal $f_{i-1,j-5}$, in accordance with rules shown in FIG. 17.

The density conversion selecting signal $g_{i-1,j-5}$ is determined such that a density conversion curve is selected taking account of the following.

1. Edge pixels mainly exist in binary image areas.
2. As the sharpness (change in the density) becomes larger, the probability of being a binary image increases, and as the sharpness (change in the density) becomes smaller, the probability of being a gradation image increases.
3. When a segment of a line exist in which a certain pixel is located between an edge pixel at the rising edge and another edge pixel at the falling edge, a probability that the line forms a character (a part of a binary image) is high if the line has a high density and is thin.
4. As the distance between a certain pixel and an edge pixel closest to the certain pixel becomes shorter, the probability that the image is a binary image increases, and as the distance between the certain pixel and the edge pixel closest to the certain pixel becomes longer, the probability of being a gradation image increases.

In the table shown in FIG. 17, for a signal taking one of two values, symbol o indicates that the signal is valid, symbol x indicates that the signal is invalid, and symbol - indicates that the signal is ignored. For a signal taking one of three or more values, a numeral represents the value of the signal. The value of the density conversion selecting signal $g_{i-1,j-5}$ has the following meaning:

when $g_{i-1,j-5}=0$, a binary image,
when $g_{i-1,j-5}=3$, a gradation image,
when $g_{i-1,j-5}=1$, probably a binary image, and
when $g_{i-1,j-5}=2$, probably a gradation image.

The density conversion circuit 3 includes four density conversion curves shown in FIG. 7, i.e., a density conversion curve A (solid line) for binary images which converts an input density signal to a binary signal i.e., to the maximum or the minimum value, a density conversion curve B (alternate long and short dash line) for gradation images which closely copies the gradation of an input density signal to an output density signal, a density conversion curve (C) (broken line) close to the density conversion curve (A) for binary images, and a density conversion curve (D) (alternate long and two short dashes line) close to the density conversion curve (B) for gradation images. The density conversion curves (C) and (D) interpolate the density conversion curves (A) and (B).

Based on the value of the density conversion selecting signal $g_{i-1,j-5}$ input from the characteristic judging circuit 12, a density conversion curve is selected in accordance with the following rules:

when $g_{i-1,j-5}=0$, density conversion curve A for binary image, when $g_{i-1,j-5}=3$, density conversion curve B for gradation image, when $g_{i-1,j-5}=1$, density conversion curve C which interpolates the density conversion curves A and B and which is close to the density conversion curve A; and when $g_{i-1,j-5}=2$, density conversion curve D which interpolates the density conversion curves A and B and which is close to the density conversion curve B. The image density signal $d_{i-1,j-5}$ is subjected to density conversion using a selected density conversion curve to output a converted density signal $cd_{i-1,j-5}$.

The density conversion circuit 3 is the same as that used in the first embodiment. In the present embodiment, the thin line detection coefficient matrixes and the edge detection coefficient matrixes are 3×3. The accuracy of the thin line detection circuit and the edge detection circuit can be increased by changing the size of the matrixes to n×m (n>0, m>0, n and m are integers), changing the coefficients, or increasing the number of the matrixes. Also, thicker lines can be detected by increasing the number of stages of delay in the dot delay circuit in the high density line detection circuit.

Although two additional density conversion curves which interpolate the density conversion curve for binary images and the density conversion curve for gradation images are used in the present embodiment, the number of the additional density conversion curves can be reduced from two to one. Also, the number of classes into which the sharpness of an edge is classified may be increased by adding comparators having different thresholds to the edge detection circuit 7, or the number of classes into which the distances are classified by the distance classifying circuit 11 may be increased, so as to provide three or more density conversion curves which interpolate the density conversion curve for binary images and the density conversion curve for gradation images.

Obviously, numerous conversions and variations of the present invention are possible in light of the above teachings. It is therefore to be understood that within the scope of the appended claims, the present invention may be practiced other than as specifically described herein.

What is claimed is:

1. An image processing apparatus in which images on an original document captured by an image capturing means are classified into a binary image and a gradation image, and the densities of the images are then converted using density conversion curves, which are provided for binary images and gradation images, to output an image signal representing converted images, said image processing apparatus comprising:

means for judging the state of a certain pixel and classifying it as one of a plurality of states between binary images and gradation images; and means for selecting, based on the results of the judgment, one curve from a first density conversion curve for binary images, a second density conversion curve for gradation images and at least one third density conversion curve which interpolates the first and second density conversion curves to convert the density of the certain pixel.

2. An image processing apparatus according to claim 1, wherein said means for judging the state of a certain pixel comprises judging means for judging the state of the certain pixel based on the probability of being a binary image which is obtained based on information representing the sharpness of an edge of the certain pixel which is determined based on the densities of pixels adjacent to the certain pixel.

3. An image processing apparatus according to claim 1, wherein said means for judging the state of a certain pixel comprises:

edge pixel detecting means for judging based on the densities of pixels adjacent to the certain pixel whether the certain pixel is an edge pixel; and judging means for judging the state of the certain pixel based on the probability of being a binary image which is obtained based on information representing the distance between the certain pixel and an edge pixel which is detected by said edge pixel detection means and is the closest to the certain pixel.

4. An image processing apparatus according to claim 1, wherein said means for judging the state of a certain pixel comprises:

thin line pixel detection means for judging based on the densities of pixels adjacent to the certain pixel whether the certain pixel is a thin line pixel;

edge pixel detecting means for judging based on the densities of pixels adjacent to the certain pixel whether the certain pixel is an edge pixel;

means for calculating the sharpness of the edge of the certain pixel based on the densities of the adjacent pixels;

line thickness calculating means for calculating the thickness of a line on which the certain pixel is located between a rising edge and a falling edge in density, based on results obtained by said edge pixel detection means;

distance calculating means for calculating the distance between the certain pixel and an edge pixel which is detected by said edge pixel detection means and is the closest to the certain pixel; and judging means for the state of the certain pixel based on the results of the judgments as to whether the certain pixel is a thin line pixel and whether the certain pixel is an edge pixel, the sharpness of the edge of the certain pixel, the thickness of the line, and the distance between the certain pixel and the edge pixel.

5. An image processing apparatus in which images on an original document captured by an image capturing means are classified into a binary image and a gradation image, and the densities of the images are then converted using density conversion curves, which are provided for binary images and gradation images, to output an image signal representing converted images, said image processing apparatus comprising:

means for judging the state of a certain pixel and classifying it as one of a plurality of states between binary images and gradation images;

means for selecting, based on the results of the judgment, one curve from a first density conversion curve for binary images, a second density conversion curve for gradation images and at least one third density conversion curve which interpolates the first and second density conversion curves to convert the density of the certain pixel; and means for producing binary data from the converted image density signal.

6. An image processing apparatus according to claim 5, wherein said means for producing binary data is means for converting the image density signal into binary data by an error diffusion method.

* * * * *